United States Patent [19]

Iwata

[11] Patent Number: 4,529,274

[45] Date of Patent: Jul. 16, 1985

[54] ELECTROCHROMIC DISPLAY DEVICE

[75] Inventor: Katsuaki Iwata, Tokyo, Japan

[73] Assignee: Kabushiki Kaisha Daini Seikosha, Tokyo, Japan

[21] Appl. No.: 400,710

[22] Filed: Jul. 22, 1982

[30] Foreign Application Priority Data

Jul. 24, 1981 [JP] Japan ................................ 56-115982

[51] Int. Cl.³ .............................................. G02B 1/17
[52] U.S. Cl. ................................... 350/357; 340/763; 340/785
[58] Field of Search ................. 350/357; 340/763, 785

[56] References Cited

U.S. PATENT DOCUMENTS

| 4,187,004 | 2/1980 | Yano et al. | 350/357 |
| 4,257,683 | 3/1981 | Kuwagahi et al. | 350/357 |
| 4,346,964 | 8/1982 | Ishihama et al. | 350/357 |
| 4,401,984 | 8/1983 | Tabata et al. | 350/357 |
| 4,443,115 | 4/1984 | Kaneko et al. | 350/357 |
| 4,479,121 | 10/1984 | Tabata | 350/357 |

FOREIGN PATENT DOCUMENTS

| 21598 | 2/1978 | Japan | 350/357 |
| 22850 | 2/1979 | Japan | 350/357 |
| 2060236 | 4/1981 | United Kingdom | 350/357 |

OTHER PUBLICATIONS

Zechman, "Alphanumeric Electrochromic Display", *IBM Technical Disclosure Bulletin*, vol. 14, No. 1, Jun. 1971, pp. 201–202.

Primary Examiner—Bruce Y. Arnold
Assistant Examiner—William Propp
Attorney, Agent, or Firm—Robert E. Burns; Emmanuel J. Lobato; Bruce L. Adams

[57] ABSTRACT

An electrochromic display device comprising an electrolyte held between a pair of substrates, at least one of which being transparent, a plurality of electrodes coated with electro-chemical coloration material formed on at least one substrate, at least a part of the plurality of electrodes composing display picture elements, wherein the display is of uniform density and can be changed only by changing the display between the plurality of electrodes coated with the electro-chemical coloration material.

8 Claims, 7 Drawing Figures

ELECTROCHROMIC DISPLAY DEVICE

BACKGROUND OF THE INVENTION

The present invention relates to an electrochromic (referred to as an EC hereafter) display device in which a display image is changed between electrodes coated with an electrochemical coloration material.

A display method of a conventional EC display device will be described in conjunction with FIG. 1.

A transparent electrode 3 is formed on an upper transparent substrate 1. A tungsten trioxide (referred to as $WO_3$ hereafter) film 5 is formed on the transparent electrode 3. Electric charges are injected into the $WO_3$ film by applying a negative electric potential to the transparent electrode 3 and a positive electric potential to a counter electrode 9 via an electrolyte 7 and a white background plate 8, whereby the $WO_3$ film colors blue. The electrolyte 7 is a solution of lithium perchlorate ($LiClO_4$) and propylene carbonate, and the white background plate 8 comprises a multipolar ceramic plate. The counter electrode 9 is made of an inert material such as gold, platinum or sintered carbon. A counter substrate 2 defines a container for sealing the electrolyte 7 and the background plate 8 with a sealing agent 10. Reference numeral 11 denotes a mask plate of the display device. The following is the formula of reaction in case the $WO_3$ film is colored.

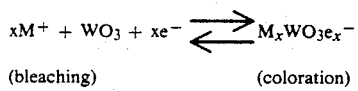

(bleaching)      (coloration)

When a positive electric potential is applied to the transparent electrode and a negative electric potential is applied to the counter electrode, the electric charges inside the $WO_3$ film are extracted, and the $WO_3$ film is bleached as indicated by the above formula.

Thus the conventional EC display device displays images by applying a voltage between the transparent electrode on which the $WO_3$ film is formed and the counter electrode to color or bleach the $WO_3$ film.

This method, however, is disadvantageous in the following respects:

1. The display device is thickened by use of a particular insert material.
2. The cost is extremely high because the counter electrode is made of expensive materials such as gold, platinum and sintered carbon.
3. The panel structure is complicated and the reliability is low since the terminals of the counter electrode must be extracted to the outside of the panel structure.

Accordingly, the present invention aims to eliminate the above noted drawbacks, and therefore it is an object of the invention to facilitate the practical use of EC display devices.

An EC display device according to the present invention eliminates a counter electrode which, in the prior art, serves for coloring the EC material, and instead, applies a voltage between groups of bleached and colored display electrodes for displaying images.

DETAILED DESCRIPTION OF INVENTION

Figure 1:
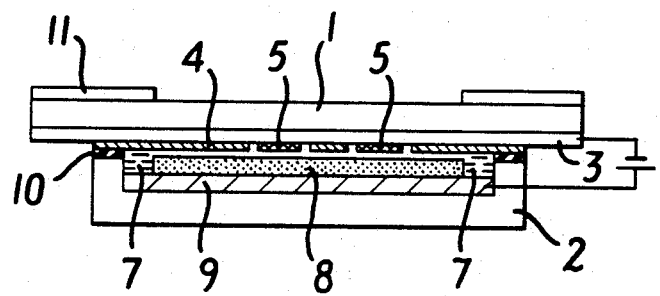
FIG. 1 is a sectional view showing the structure of a conventional electrochromic display device.
Figure 2:
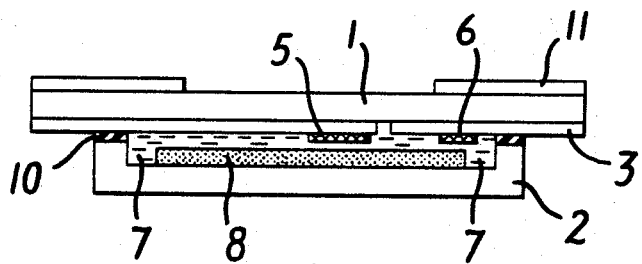
FIG. 2 is a sectional view of an electrochromic display device showing an embodiment of a display device according to the present invention.
Figure 3:
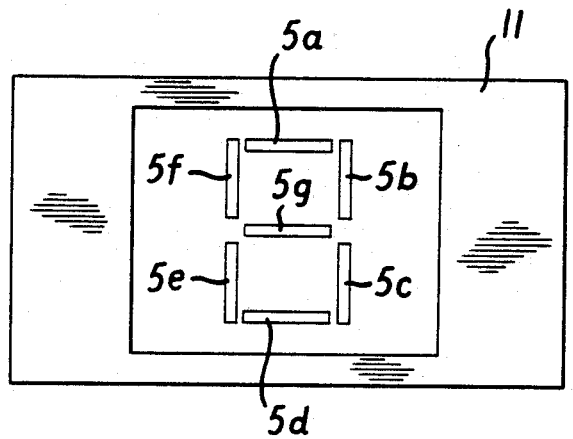
FIG. 3 is a plan view of a conventional display which constantly applies electric charges from a counter electrode.
Figure 4:
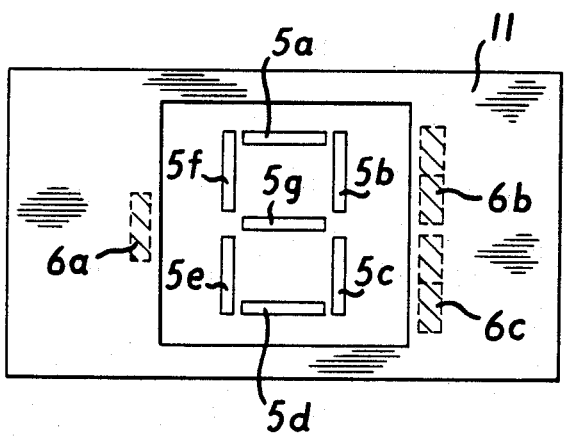
FIG. 4 is a plan view of a display using the electric charge transfer method according to the present invention in which electric charges are exchanged between display electrodes by providing a dummy electrode.

FIG. 1 shows a conventional electrochromic display device according to the present invention. FIG. 2 shows an embodiment of an electrochromic display device according to the present invention, in which the counter electrode 9 and an insulating film 4 which are required in the FIG. 1 construction are eliminated. FIG. 3 shows a plan view of a conventional 7-segments display pattern and FIG. 4 shows a plan view of a 7-segments display pattern according to the present invention. Reference numerals 5a-5g denote display segment $WO_3$ films and 6a-6c are dummy segment $WO_3$ films.

A conventional display method and the present display method will be illustrated in conjunction with the drawings. In a conventional display method, the EC display device is displayed by applying a voltage between a counter electrode and a transparent electrode coated with a $WO_3$ film (referred to as $WO_3$ electrode hereafter) as heretofore described. The change of the display state will be illustrated. For displaying a numeral 1, $WO_3$ electrodes 5b and 5c are connected to a negative electric potential and the counter electrode is connected to a positive electric potential to color the $WO_3$ film. When the numeral 1 changes to numeral 2, the electrode 5c is connected to the positive electric potential and the counter electrode is connected to the negative electric potential to bleach 5c. After this, the $WO_3$ film, once colored, holds its coloration state even if the voltage is off. This feature is what is called a memory characteristic. The coloration state of the electrode 5b is maintained without applying a voltage, taking advantage of the memory characteristic, whereby numeral 2 is displayed. Another changing method of numerals is to bleach all the colored $WO_3$ films and then freshly color the next numeral.

Figure 5:
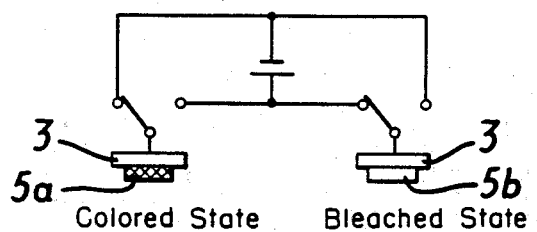
FIG. 5 is a schematic illustration of a driving circuit for experiment.

A display method according to the present invention will now be illustrated. Initially, the principle of coloration according to the present invention will be illustrated in conjunction with FIG. 5. In the prior art, the coloration and bleaching of EC display devices was carried out by a counter electrode. It has been found, however, that the $WO_3$ films are gradually colored by changing a positive electric potential and a negative electric potential between two $WO_3$ electrodes alternately at a certain cycle as shown schematically in FIG. 5. This phenomena may be occur because the $WO_3$ electrodes serve as a counter electrode when bleaching. Therefore, an insulation film is not formed in this structure to use the bleached electrodes effectively. This method of changing the display state between plural WO3 electrodes alternately is called the "electric charge transfer" method since electric charges are transferred through the electrolyte directly between the WO3 films. It has been found, through a number of basic experiments, that the density of the WO3 films colored by the electric charge transfer method is controlled by factors such as the thickness of the WO3 film and drive voltage. The following experiment is made on the basis of the data of the basic experiment. The WO3 film thicknesses are 3 KÅ, 5 KÅ and 7 KÅ and the drive voltages are 1.5 V, 1.75 V and 2.0 V. The following conclusions are found by the resultant data shown in FIG. 6.

1. The density of the WO3 film is higher as the voltage is higher.
2. The density of the WO3 film is higher as the thickness of the WO3 film is increased.

The coloration density in this experiment is defined as follows. The reflection factor of the white background plate is defined as 100%, while the relative reflection factor of the colored portion to that of the white background is defined as the coloration density. When the white background plate is measured by a color difference meter, the data of X:77, Y:80 and Z:95 is obtained.

Figure 6:
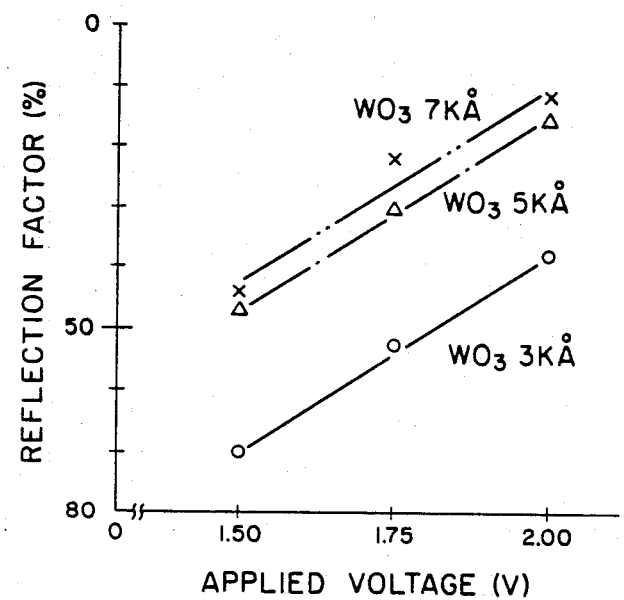
FIG. 6 is a plot of experimental data using a display device according to the present invention.

Generally, a vivid display is realized if the coloration density is more than 40%. The coloration density in FIG. 6 is checked by the following method.

The number of charge transfer cycles to stabilize the density is around 100 cycles by the basic experiment. The density after 200 transfering cycles is plotted in the experimental data. One cycle consists of a positive electric potential applied for 1 second and a negative electric potential applied for 1 second. Two hundred cycles are applied to the segments 5a and 5d.

The structure of the EC display device according to the present invention will now be illustrated in detail. An upper transparent substrate 1 is of a glass, on which is formed a transparent electrode film. The transparent electrode film is an indium oxide ($In_2O_3$) film or a tin oxide ($SnO_2$) film formed by the spraying method. The transparent electrode film is patterned at the desired forms by the photo technique and etching technique. WO3 films in given patterns or forms are coated on patterned transparent electrodes 3 by the vaccum evaporation method. In their embodiment the WO3 films are: display segment WO3 films 5a, 5b, 5c, 5d, 5e, 5f and 5g; and dummy segment WO3 films 6a, 6b and 6c. Numeral 7 denotes an electrolyte consisting of lithium perchlorate ($LiClO_4$) and propylene carbonate solution. The electrolyte 7 colors the WO3 films since $Li^+$ is injected into them together with electrons when a voltage is applied. A white background plate 8 is provided to show up the blue WO3 films vividly. The white background plate is of multi-polar shape having a certain porosity to fill the electrolyte sufficiently and to pass through electric charges (electrons and $Li^+$) easily. The counter substrate 2 serves as a container to seal the white background plate and the electrolyte by the sealing agent 10. The counter substrate is made of glass or ceramic. The mask plate 11 is configured to mask and conceal the dummy electrodes, sealing agent portion and the like and the mask plate has an opening therethrough for exposing the display electrodes. An experiment on driving a watch display is further made with reference to the experimental data in FIG. 6, using the EC display device.

A method of changing the display state of the 7-segments according to the present invention will be illustrated in conjunction with FIG. 4. In FIG. 4 the dummy electrodes 6a, 6b and 6c are positioned to always balance the total area of the colored WO3 electrodes and the total area of the bleached WO3 electrodes. FIG. 4 shows that the same quantity of electric charges are always transferred between the WO3 coated electrodes, i.e., the display changing method according to the present invention is the same as that of the basic experiment. The display changing method will now be illustrated. Each area of the 7-segments WO3 electrodes 5a, 5b, 5c, 5d, 5e, 5f and 5g is 1 unit, the area of the dummy WO3 electrode 6a is 1 unit, and that of the electrodes 6b and 6c is 2 units. As shown in FIG. 4, the dummy electrodes 6b and 6c are disposed in a line in end-to-end relationship.

TABLE 1

|   | display segment (5) | | | | | | | dummy segment (6) | | |
|---|---|---|---|---|---|---|---|---|---|---|
|   | a | b | c | d | e | f | g | a | b | c |
| 0 |   |   |   |   | o |   | x |   |   |   |
| 1 | x |   |   | x | x | x |   |   | o | o |
| 2 | o |   | x | o | o |   | o | x | x |   |
| 3 |   |   | o | x |   |   |   |   |   |   |
| 4 | x |   |   | x |   | o |   | o |   |   |
| 5 | o | x |   | o |   |   |   | x |   |   |
| 6 |   |   |   |   | o |   |   | o |   | x |
| 7 |   | o |   | x | x | x | x | x | o | o |
| 8 |   |   |   | o | o | o | o |   | x | x |
| 9 |   |   |   |   | x |   |   | o |   |   |

Table 1 shows the display changing method. The mark O indicates that the negative electric potential (colored state) is held, the mark X indicates that the positive electric potential (bleached state) is held, and the blank space indicates that the display state just before changing the display is held. The Table 1 is an example wherein the display of numerals 0 to 9 are changed in turn.

Figure 7:
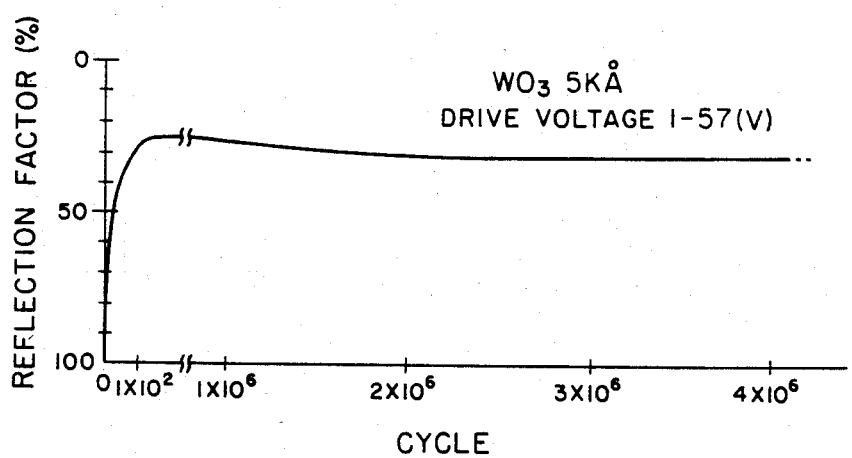
FIG. 7 is a graph showing a change in density when the display device according to the present invention is used in a timepiece.

The specifications and structure of an EC display device used as a time display will be illustrated. The electrodes comprise indium oxide film, no insulating film between the electrodes is needed, the WO3 film thickness is 5 KÅ, the time display content comprises 4 digits (an hour-minute display) with each digit being a 7 segments system, and the cell area is 10 mm×20 mm. The transfer time in this experiment is also 2 sec/cycle (the same as the basic experiment), the display of the time is changed in the same way as in timepieces, the coloration density was plotted each cycle, and the cycle is replaced by the actual hour-minute display to check the life in actual use. As a result of driving the time display in this way, the experimental data as shown in FIG. 7 is obtained. In this experiment no changes in the display density and appearance are found even by changing display of $4 \times 10^6$ cycles. If the 2 sec./cycle-display change is replaced by 1 min. (60 sec.)/cycle-display change, the display change is maintained for more than 7 years.

This invention has the above noted structure and achieves an EC display device with stable display density as shown by experimental data and long-term tests.

The following advantages are achieved by the present invention.

(1) Characters and numerals are displayed by simple driving circuits since the function of the counter electrode is not needed.
(2) The cell structure can be made thinner since the counter electrode is not needed. An extreme reduction in cost is realized by the reduction in the number of the manufacturing processes since expensive and special materials are not used.

(3) By this system a new, stable display density is achieved.

Thus, a remarkable improvement is achieved and a practical and excellent EC display device is realized.

I claim:

1. An electrochromic display device comprising: a first substrate; a second substrate spaced apart and facing the first substrate; an electrolyte held between the first substrate and the second substrate; a plurality of electrode segments disposed solely on the first substrate and having disposed thereon electrochromic material in contact with the electrolyte such that the electrode segments exhibit either colored or bleached states depending on the amount of electric charge held by the electrode segments, some of the electrode segments comprising display segments disposed in a pattern to form a display and others of the electrode segments comprising dummy segments which do not form part of the display; a mask plate superposed on the first substrate for concealing from view the dummy segments and having an opening therethrough for exposing the display segments; and means for selectively applying a DC electric field between preselected bleached electrode segments and colored electrode segments effective to transfer electric charges between the preselected electrode segments through the electrolyte to thereby change the display state of the electrochromic display device.

2. An electrochromic display device according to claim 1; wherein the dummy segments each have an area which is an integer multiple of that of the display segments.

3. An electrochromic display device according to claim 2; wherein the display segments all have areas of the same size.

4. An electrochromic display device according to claim 3; wherein the dummy segments comprise one set of dummy segments each of which has an area the same as that of the individual display segments and being located on one side of the pattern of display segments, and another set of dummy segments each of which has an area twice that of the individual display segments and being located on the other side of the pattern of display segments.

5. An electrochromic dummy device according to claim 4; wherein the display segments comprise at least one 7-segment digit pattern; and the said another set of dummy segments comprises four dummy segments.

6. An electrochromic display device according to claim 5; wherein the said four dummy segments are disposed in a line in end-to-end relationship.

7. An electrochromic display device according to claim 4; wherein the said another set of dummy segments comprises a plurality of dummy segments disposed in a line in end-to-end relationship.

8. An electrochromic display device according to claim 7; wherein the said another set of dummy segments consists of four dummy segments.

* * * * *